US010423671B2

(12) United States Patent
Underwood et al.

(10) Patent No.: US 10,423,671 B2
(45) Date of Patent: Sep. 24, 2019

(54) SELECTION BEHAVIOR HISTORY AND TRANSFORMATION

(71) Applicant: Apple Inc., Cupertino, CA (US)

(72) Inventors: David A. Underwood, Arlington, VA (US); Elizabeth G. Reid, San Francisco, CA (US); Peter Su, Pittsburgh, PA (US)

(73) Assignee: Apple Inc., Cupertino, CA (US)

( * ) Notice: Subject to any disclaimer, the term of this patent is extended or adjusted under 35 U.S.C. 154(b) by 257 days.

(21) Appl. No.: 15/273,497

(22) Filed: Sep. 22, 2016

(65) Prior Publication Data

US 2017/0357675 A1    Dec. 14, 2017

Related U.S. Application Data

(60) Provisional application No. 62/348,752, filed on Jun. 10, 2016.

(51) Int. Cl.
*G06F 16/93* (2019.01)
(52) U.S. Cl.
CPC .................................. *G06F 16/93* (2019.01)
(58) Field of Classification Search
CPC ...................................................... G06F 16/93
See application file for complete search history.

(56) References Cited

U.S. PATENT DOCUMENTS

| 6,453,328 | B1 | 9/2002 | Schaeffer et al. |
| 2004/0268187 | A1* | 12/2004 | Burke ........................ G06F 8/38 714/40 |
| 2008/0172607 | A1* | 7/2008 | Baer .................... G06F 17/2211 715/255 |
| 2015/0193492 | A1 | 7/2015 | Gunaratne et al. |

OTHER PUBLICATIONS

Ellis, C.A.; Gibbs, S.J. (1989), "Concurrency control in groupware systems", ACM SIGMOD Record 18(2): 399-407.
Wikipedia, Operational transformation, https://en.wikipedia.org/wiki/Operational_transformation, 10 pages.

* cited by examiner

*Primary Examiner* — Robert W Beausoliel, Jr.
*Assistant Examiner* — Hau Hoang
(74) *Attorney, Agent, or Firm* — Womble Bond Dickinson (US) LLP

(57) ABSTRACT

All environment for creating a document by collaboration of multiple concurrent users, coupled through a network to a server system, user undo and redo commands and those commands are associated with corresponding undo selection behavior data and redo selection behavior data. The undo and redo selection behavior data specify how the selection of one or more objects changes when undo or redo commands are involved. The undo and redo selection behavior data are transformed based on changes to a server copy.

20 Claims, 6 Drawing Sheets

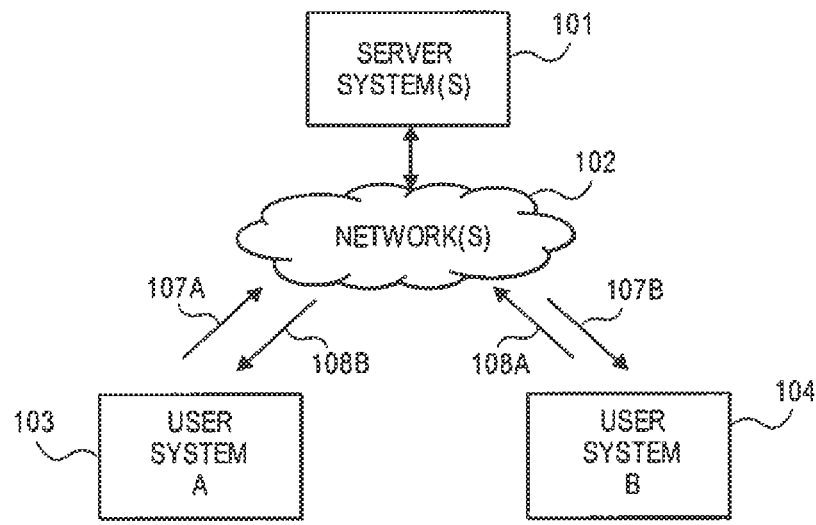

SELECTION BEHAVIOR HISTORY AND TRANSFORMATION

This application claims the benefit of U.S. Provisional Patent Application No. 62/348,752, filed on Jun. 10, 2016, which application is incorporated herein by reference.

BACKGROUND

The embodiments described herein relate to collaborative environments in which a document is created and edited by a team of users who can concurrently work on the document over time to create and edit the document.

Data processing systems for providing a collaborative environment to create and edit the document by multiple users, who are often creating and editing the document concurrently in time, have existed for some time. For example, Google Wave and Google Does are examples of applications which can provide real time collaboration. One technology that has been used to facilitate such applications is a technology referred to as operational transformation which supports a range of collaboration functionalities are advanced collaborative software systems. Operational transformation was originally developed for consistency maintenance and concurrency control in collaborative editing of plain text documents. Sec for example Ellis, C. A.; Gibbs, S. J. (1989), "Concurrency control in groupware systems", ACM SIGMOD Record 18(2): 399-407.

SUMMARY OF THE DESCRIPTION

In one embodiment described herein, a collaborative environment for creating a document by multiple concurrent users, who are coupled through a network to a server system, uses undo and redo commands and those commands are associated with corresponding undo selection behavior data and redo selection behavior data. The undo and redo selection behavior data specify how the selection of one or more objects change when undo or redo commands are invoked. The undo and redo selection behavior are, in one embodiment, transformed based on changes to a server copy, where the transformation can use operational transformation.

In one embodiment, a method can be performed in a collaborative environment which includes a server system and at least a first user system and a second user system, where the server system is coupled to the first user system and the second user system through, for example, a network. The method can be performed on the first user system and can include: receiving an input which requests a change to a first copy of a document; the input can be a command such as a delete command, etc. The method further includes recording, in response to receiving the input, an undo command which is configured to undo the change to the first copy of the document. The method further includes recording an undo selection behavior data and recording a redo selection behavior data, where the undo selection behavior data indicates a selection state of one or more objects in the first copy of the document which existed prior to the input, and the redo selection data behavior indicates a selection state of one or more objects in the first copy or the document which exists after the input causes the change. The method can further include receiving data about changes to a server copy of the document, the data indicating one or more changes from the second user system. The method can further include determining one or more operational transformations to the input which indicates the change to the first copy and also determining one or more operational transformations to the undo command and also to the undo selection behavior data and to the redo selection behavior data. The one or more operational transformations arc based on data about the changes to the server copy. The method can further include transforming the undo command and the undo selection behavior data and the redo selection behavior data based on the determined operational transformations. In one embodiment, a selection behavior (and any transformation of it) determines which objects in a document are selected when the user chooses undo (or redo after an undo).

The method can also include receiving a selection of one or more objects in the first copy of the document prior to, or concurrent with, receiving the input (e.g. a command) which indicates the change to the first copy, wherein the received selection of the one or more objects determines the selection state of the one or more objects prior to the input or command which causes a change to the first copy of the document. The method can further include storing at the first user system the transformed undo command, the transformed undo selection behavior data and the transformed redo selection behavior data.

In one embodiment, the operational transformation to the undo selection behavior data transforms data about the selection state of one or more objects in the first copy which existed prior to the input or command to change the first copy, and the operational transformation to the undo selection behavior data transforms one or more of: what objects are selected; selected or unselected state of objects; change of sub-selection state of an object (e.g. cursor position in a table cell); position of selection box or current cursor input position. Further, in one embodiment, the operational transformation to the redo selection behavior data transforms data about the selection state of one or more objects in the first copy which exists after the input which causes the change to the first copy, wherein the operational transformation to the redo selection behavior data transforms one or more of: what objects are selected; selected or unselected state of objects; change of sub-selection state of objects (e.g. cursor position in a table cell); or position of selection box or current cursor input position.

In one embodiment, the transformed undo selection behavior data and the transformed redo selection behavior data are not transmitted to the server system.

In one embodiment, for each command applied to the first copy of the first user system: its undo command (and its redo command when created) and the corresponding undo selection behavior data and the corresponding redo selection behavior data are stored in one or more history data structures at the first user system. In one embodiment, the redo command is created in response to selection and execution of an undo command. For each undo command and redo command in the one or more history data structures, data is stored to indicate the association with its corresponding undo selection behavior data and its corresponding redo selection behavior data. In one embodiment, each command has a unique identifier which can be stored in the one or more history data structures. In one embodiment, the first user system and the second user system each execute, over time, the same set of commands on their respective copies of the document in the same order which is specified by the server system and can be referred to as server order or the server's order. In one embodiment, the copy of the document on the server, otherwise known as the server copy is treated as truth for all users and can be referred to as "server truth". The first user system and the second user system can be coupled either directly or indirectly to the one or more server systems. For example, the first user system and the second user system can be coupled through one or more networks, such as the Internet, to one or more server systems. The first user system can execute a native application while the second user system can execute a web browser which includes software loaded in a web page which provides similar functionality to the native application. The one or more server systems can also execute the native application but in a server mode in which it receives the commands from users and implements those commands and then transmits new commands received since the last transmission of commands to all clients for processing of those commands as described herein.

In one embodiment, the first user system can determine, by examining the data about changes to the server copy whether the server system has acknowledged receipt of any commands sent from the first system which requested a change to the first copy. In one embodiment, each system treats receipt of commands that it sent to the server as an acknowledgement of receipt an execution by the server of those commands. In other words, updates to the document sent by the server are checked by each system for its own commands previously sent to verify acknowledgement of receipt and execution of those commands.

In one embodiment, the method can also include, in response to receiving the data about changes to the server copy: rolling back, the first copy, all commands received at the first user system that have either not been sent to the server system or not acknowledged by the server system if they were sent, and the rolling back produces a rolled back first copy. Then the first user system can apply, on the rolled back first copy, the changes specified in the data about changes to the server copy, and then the first user system can transform the rolled back commands based on the changes specified in the data about changes to the server copy, the transforming producing rolled back commands that arc transformed. Then, the first user system can reapply to the first copy the rolled back commands that have been transformed, and each of the rolled back commands that are transformed are associated with transformed undo selection behavior data and transformed redo selection behavior data (although there is no rollback/reapply for these transformed undo and redo selection behaviors).

The methods described herein can be implemented by data processing systems, such as a smartphone or desktop computer or laptop computer or tablet computer or entertainment system or other consumer electronic devices or server systems. The methods described herein can also be implemented by one or more data processing systems which execute executable instructions, stored on one or more non-transitory machine readable media, that cause the one or more data processing systems to perform the one or more methods described herein. Thus the embodiments described herein include methods, data processing systems, and non-transitory machine readable media.

The above summary does not include an exhaustive list of ail embodiments in this disclosure. All systems and methods can be practiced from all suitable combinations of the various aspects and embodiments summarized above, and also those disclosed in the Detailed Description below.

BRIEF DESCRIPTION OF THE DRAWINGS

The present invention is illustrated by way of example and not limitation in the figures of the accompanying drawings in which like references indicate similar elements.

FIG. 1 shows an example of a collaborative environment which can include a plurality of user systems and one or more server systems.

FIGS. 2A, 2B, 2C, 2D, and 2E show various examples of selections of data objects.

DETAILED DESCRIPTION

Figure 3:
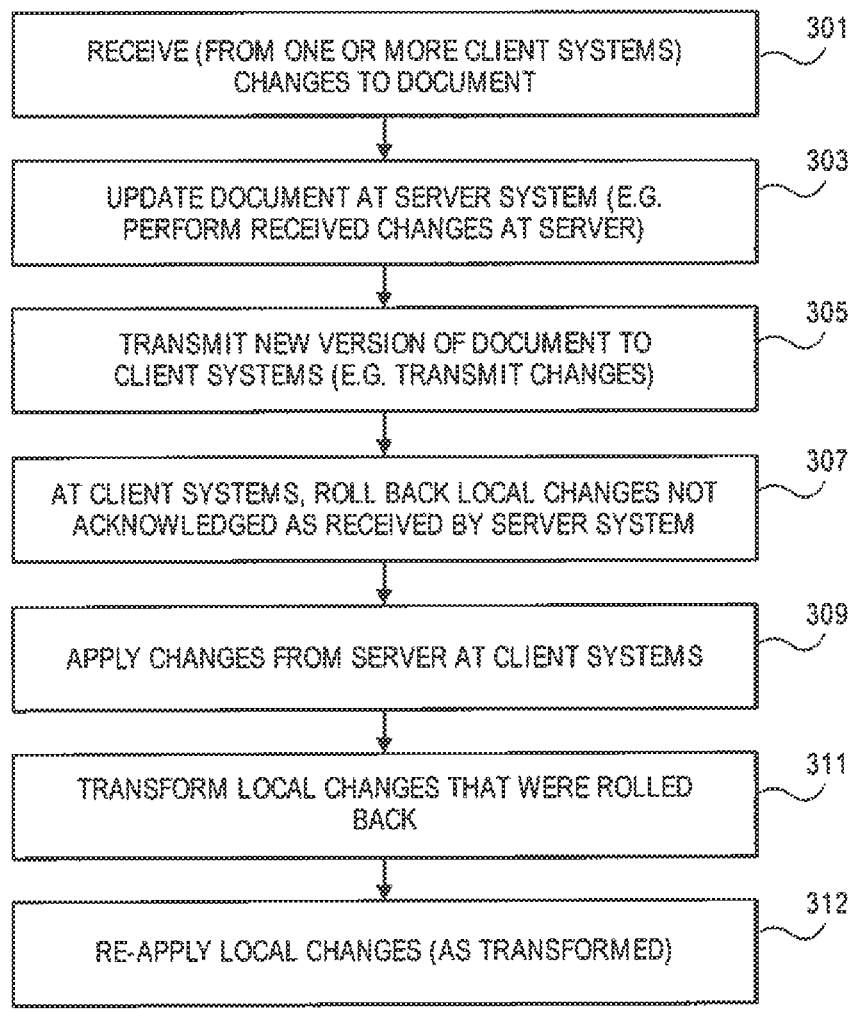
FIG. 3 is a flowchart which illustrates a method according to one or more embodiments described herein.

Various embodiments and aspects will be described with reference to details discussed below, and the accompanying drawings will illustrate the various embodiments. The following description and drawings arc illustrative and are not to be construed as limiting. Numerous specific details are described to provide a thorough understanding of various embodiments. However, in certain instances, well-known or conventional details are not described in order to provide a concise discussion of embodiments.

Reference in the specification to "one embodiment" or "an embodiment" means that a particular feature, structure, or characteristic described in conjunction with the embodiment can be included in at least one embodiment. The appearances of the phrase "in one embodiment" in various places in the specification do not necessarily all refer to the same embodiment. The processes depicted in the figures that follow are performed by processing logic that comprises hardware (e.g. circuitry, dedicated logic, etc.), software, or a combination of both. Although the processes are described below in terms of some sequential operations, it should be appreciated that some of the operations described may be performed in a different order. Moreover, some operations may be performed in parallel rather than sequentially.

A collaborative environment for creating a document among multiple authors or users typically involves a plurality of different user systems, each operated by a user and one or more server systems. FIG. 1 shows an example of such a collaborative environment. The collaborative environment shown in FIG. 1 includes one or more server systems 101 coupled through one or more networks 102 to a plurality of user systems, such as user system 103 and user system 104. The one or more networks 102 can be, for example, the Internet. In other embodiments, the server system may be directly connected to each of the user systems through techniques known in the art or may be connected to the user systems through a local area network, etc. Each of the systems shown in FIG. 1 can be, for example, a desktop computer or a laptop computer or a tablet computer or other consumer electronic devices, although server systems are typically implemented with at least something like a desktop computer or other data processing system which can provide similar processing power. In one embodiment, each of the systems can be executing a native application designed to create and edit a document, such as a word processing document, a spreadsheet document, a graphics document, a presentation document (such as Keynote or PowerPoint) or other types of documents which can be created in a collaborative environment. Thus, the user systems 103 and 104 can each include a native application, such as a word processing application to create the document in the collaborative environment and the server system can include a server version of that native application to receive commands and data from the user systems and to transmit updates to the documents to some or to all user systems. In an alternative embodiment, the user systems may use for at least some of the systems a web browser which can display a web page which includes embedded software that can enable the web page to display and process the document in a collaborative environment. For example, user system 103 may include a native application to process the document in a collaborative environment while the user system 104 can use a conventional web browser which is configured to process. JavaScript or other software within a web page to enable the web browser to present the document in the collaborative environment and to process local commands to effect changes in the local copy as well as send changes to the server and to receive changes from the server and to process those changes in the manner described herein.

FIG. 1 shows how the collaboration is performed by the transmission of commands from each user system to the one or more server systems 101 and by the receipt of commands from other systems, such as user system 103 and user system 104. In particular, user system 103 transmits its commands which specify changes to its copy of the document in a transmission 107A, and those commands are transmitted from the server system 101 to the user system 104 as transmission 107B. Similarly, the user system 104 transmits transmission 108A which includes commands indicating changes made by the user of user system 104 to the local copy on system 104. The transmission 108A is received by the one or more server systems 101 and processed to make changes to the server copy, and after those changes are made, the server transmits a transmission 108B which includes the commands indicating changes made by the user of system 104 for receipt by user system 103, in one embodiment, the server maintains the server copy which is considered the truth of the document and the system is implemented in a manner in which each client, such as user system 103 and user system 104 must execute the same commands in the same order so that each user's document looks the same after processing all of the commands. The order of the commands is specified by the server and can be referred to as a server order and the copy on the server can be referred to as the server copy and can be considered the "truth" for the document being created in the collaborative environment. In one embodiment, each user system will transmit commands and data indicating changes to its local copy that have not been previously transmitted to the server systems or if they were previously transmitted have not been acknowledged as received and processed by the one or more server systems 101.

Some background information in connection with selection of data objects will now be provided in conjunction with FIGS. 2A, 2B 2C, 2D, and 2E. In the examples shown in these figures, various objects are shown in a selected state. It will be appreciated that a selected state for an object indicates that that object is to be used in an operation performed in response to receipt of the next command, such as a deletion command or a command to indicate that the text needs to be stylized as bold, etc. In other words, the selection of an object is a precursor to a command or an operation selected by the user to cause a change to the document or selected object. A selection can be considered to be an affordance in the user interface that lets a user see or otherwise comprehend, from the user interface, the scope or locus of changes that the user makes to the document. For example, as shown in FIG. 2A, the string of text 201 has the word "selected" selected for a future operation as indicated by selection box 203. In contrast, the string of text 204 shown in FIG. 2B has all of its text selected as indicated by selection box 205. It will be appreciated that users have a variety of ways of selecting text such as the dragging of a mouse to drag a cursor over the text or the dragging of a finger over the text, or voice commands, etc. In each case, the user can select one or more objects of text, and then can select a command to perform an operation on the text, such as the deletion of the text, the highlighting of the text, a strike through operation of the text, making the text bold, cutting or pasting text, etc. FIG. 2C shows an example of a text cursor which indicates where text will be placed when entered; it can also be referred to as an insertion point in that it shows the current insertion point for text if new text is entered. In the example shown in. FIG. 2C the text cursor 20 is at the end of the string of text 207. FIG. 21) and 2 illustrate examples of how graphics objects can be selected, such as the selection of graphics objects in graphics or drawing programs. In particular, a graphics or drawing program can show a triangle 215, a square 217, and an oval 219. In the example shown in FIG. 21), the oval has been selected as shown by the selection box 220 while in FIG. 2E, the oval and the triangle 215 are selected as shown by selection boxes 220 and 221.

In the embodiments described herein, the methods provide techniques for preserving the behavior of the local selection made by a user when undo and redo commands are invoked by a user during editing of a document. The preservation of the behavior of the local selection can be done by storing the selection behavior data which can specify what the selection should become when the user undoes or redoes a previous command (and this is desirable because the user most likely wants to focus on the document object that the undo or redo just changed, both to see what changed and also to possibly work on that object further).

An overview of a method according to one embodiment will now be provided in conjunction with references to FIG. 3. The methods shown in FIG. 3 can be implemented in the system shown in FIG. 1 for providing a collaborative environment for creating and editing a document. In operation 301, one or more server systems, such as server system 101, can receive (from one or more client systems) changes to a document in the collaborative environment. The changes can be indicated by one or more commands and data associated with the document. In one embodiment, each client may send only the most recent commands executed at the client system since the prior set of commands which were acknowledged as received and processed by the one or more server systems, such as server system 101. Thus, rather than transmitting the entire document from a client to the server and requiring the server to determine what the changes are, each client on its own determines what changes have occurred since the last transmission of commands which were acknowledged as received by the server system. In one embodiment, acknowledgement of receipt by the server system is performed by each client examining changes received from the server to determine whether a command which is sent by the client has been received by finding (and then ignoring) that command in the changes from the server. After the server receives in operation 301 the changes to the document from one or more client systems, the server system in operation 303 updates the document at the server system by performing the received changes (expressed as commands and associated data) at the server on the server's copy ("server copy"). In one embodiment, the server copy is considered the "truth" for the document, and the server stores in a list of commands in a particular order which is the server order of the commands that were executed on the server copy over time based upon the changes received from each of the user systems, such as user system 103 and 104 shown in FIG. 1. After the server system updates the document in operation 303, it can then transmit the new version of the document (or changes only) in operation 305. In particular, in operation 305, the server system can transmit to all of the client systems the last set of changes that were made since the last transmission of changes from the server system. In one embodiment, only those changes are transmitted rather than transmitting the entire document. Prior commands that were transmitted by the server system to the client systems are not transmitted again in one embodiment. Then in operation 307, each client system which receives the transmission of the changes from operation 305 will perform a rollback operation. In one embodiment, a rollback operation will roll back the local changes or commands not acknowledged as received by the server system. In other words, each of the local commands executed at a user system that have not been sent to a server system or if sent were not acknowledged as received by the server system will be rolled back causing the document to change its state to the state which existed prior to all such local commands which were rolled back. The rolling back process undoes each of the commands that have not been sent or have not been acknowledged as received. This provides a consistency point at the client system and it ensures that all of the commands on the local copy at the client system will be executed in the same order as the commands on the server copy. Then in operation 309, the user system, such as user system 103 or user system 104 applies the changes from the server at the client system. In other words, the changes received through the transmission operation in operation 305 are applied to the rolled back version of the local copy in operation 309. Then in operation 311, each user system transforms the local changes that were rolled back by using, for example, known operational transformations to transform those local changes or local commands, which can then be reapplied to the local copy in operation 312. The method shown in FIG. 3 typically repeats over time as each user system receives local inputs and transmits those local inputs to the server system and receives changes from the server reflecting changes in the server copy over time. In each case, as the cycle repeats, the method shown in FIG. 3 is repeated over time. At any given time in one embodiment, a user system (such as user system 103 or 104) can have three independent collections of commands: a queue of outgoing commands that have been previously executed locally on the user system but have not been acknowledged by the server; the stack of undo commands and their associated selection behaviors; and the stack of redo commands and their associated selection behaviors. The undo commands were created when the user previously caused a command to be executed or chose "redo" command, but the undo commands have not themselves been executed and will only be executed if/when the user selects/chooses the undo command. The first collection, the queue of outgoing commands, is what, in one embodiment, undergoes rollback, transformation and reapply when incoming commands (from the server) are received. However, the stack of undo commands and the stack of redo commands are not rolled back and are not reapplied because they were not executed. Their associated selection behaviors are, however, transformed.

Figure 4:
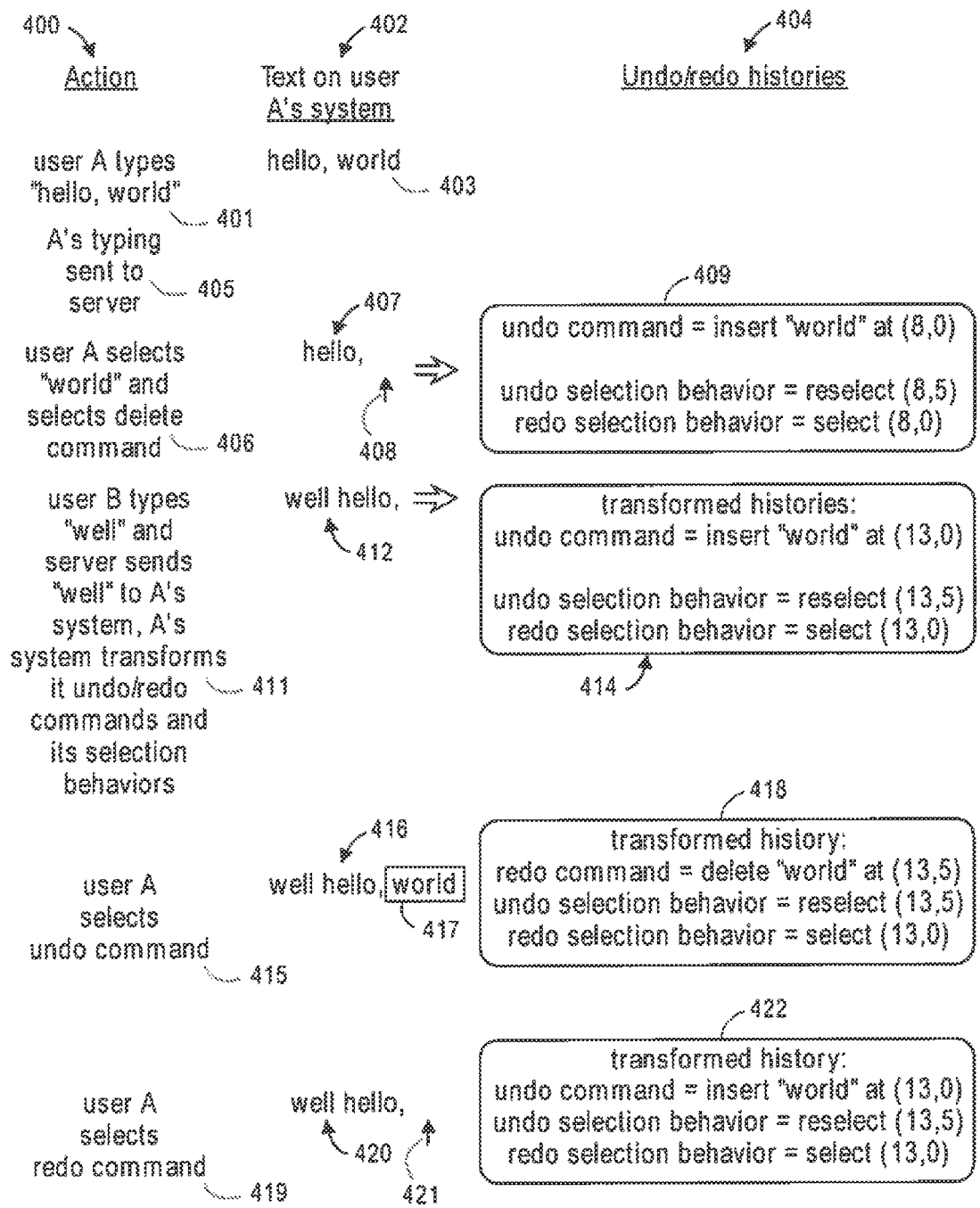
FIG. 4 shows an example of how text can be edited in a collaborative environment which can cause changes to one or more undo and redo history data structures.
Figure 5:
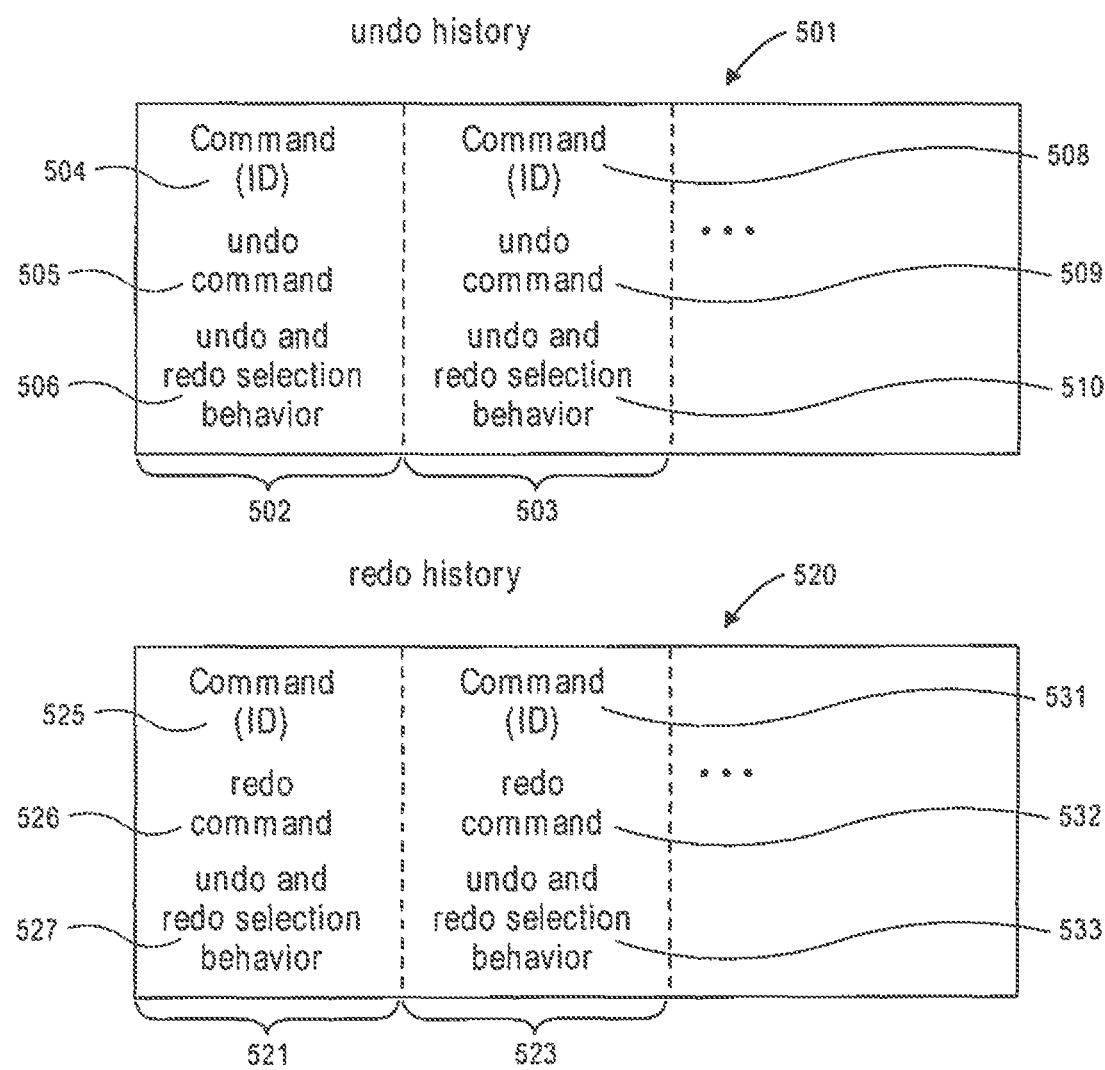
FIG. 5 shows an example according to one embodiment of undo and redo history data structures.

FIG. 4 shows an example of how the selection state is maintained for a local user even though changes from the server are received and implemented, which changes can affect the selection behavior of selections made by the user. FIG. 4 shows three columns 400, 402, and 404. Column 400 indicates actions which occur over time starting from the top of FIG. 4 to the bottom of FIG. 4. The actions cause changes of text on user A's system which can be, for example, user system 103. User A is working in a collaborative environment with user B who is operating user system 104, and both user systems are in communication with one or more server systems, such as server system 101 to create and edit a text document. Thus column 402 shows the text as it appears on user A's system through the actions over time shown in column 400. Column 404 shows one or more undo and redo history data structures, and can be similar to the undo and redo history data structures shown in FIG. 5, for example. Action 401 can be the beginning of the creation of the document in which user A types "hello, world" and this in turn creates the text displayed on A's system "hello, world" 403, User A's typing is sent to the server system, such as server system 101 in action 405. The server system can then process A's typing to enter the text into the server copy, and can then transmit the text "hello, world" to at least user B's system and also in one embodiment also to user A's system (and A's system will ignore that received text).

In action 406, the user selects the world "world" and selects the delete command. This results in the display of text 407 which shows that the word "world" has been removed from the display and there may be a text cursor or insertion point or other indicator of the current text entry position. In the example shown in FIG. 4, the arrow 408 indicates the current text insertion point, although the text cursor may be a blinking vertical line or other known text cursors. As a result of action 406, an undo and redo history is created for the deletion command in action 406. In particular, the history 409 shows that the user A's system has determined and created an undo command for the delete command, which in this case is an undo command that indicates to insert "world" at (8,0). The 8 indicates the position that the undo command begins at and 0 indicates the undo command is an insert. In this embodiment, undo commands (and their corresponding history) are created when the user causes the execution of a command or selects a redo command. In addition, the history data structure 409 also includes an undo selection behavior which indicates the selection state of one or more objects in the local copy of user A's system which existed prior to the command in action 406. In the case of history 409, the undo selection behavior is reselect at (8,5), which indicates to the system that if the user selects the undo command then the undo selection behavior needs to reselect the word starting at position 8 and extending for 5 characters. This will cause the system to reselect the characters that begin at position 8 and run for 5 characters. The history data structure 409 also includes a redo selection behavior which in this case is a select at (8,0) which indicates to user's A system that upon receiving a redo command, the selection will place the text cursor at position 8. The result of a redo command with this selection behavior is to cause the text cursor to be placed at position 8. In one embodiment, the history data structure is saved with the local copy on user A's system, and the delete command 406 can be sent to the server system after action 406.

Then in operation 411, user B types the word "well" and the server sends the word "well" to A's system. At this point in time, the server copy may or may not have user A's deletion of the word "world", but does have user A's initial action shown in action 401 and also has the addition by user B of the word "well" at the beginning of the text string. Whether or not the server copy has A's deletion, the undo/redo histories at the client system (A's system) are transformed, in one embodiment, in the same way; in other words, for a given batch of incoming commands (from the server), the undo and redo histories and their corresponding undo selection behaviors and the redo selection behaviors are always transformed M the same way, based on those incoming commands, regardless of what unacknowledged outgoing commands arc still pending in the outgoing command queue of A's system. FIG. 4 shows one instance of an incoming coming command, but it will be appreciated that this process can repeat as different additional incoming commands are received. The result of all of these actions in action 411 produces the display of text 412, which includes user B's addition of the word "well" and also includes the deletion of the word "world", and also produces a transformation of the histories including a transformation of the undo command as well as the undo selection behavior and the redo selection behavior resulting in the history 414 shown in FIG. 4. In particular, the undo command has been transformed, as shown in history 414, by changing the command to insert the word "world" at (13,0). This means that when the undo command is received from user A, the system operated by user A will insert the word "world" at position 13 resulting in the text string 416 appearing on A's system. Further, the undo selection behavior has been transformed, as shown in history 414, to reselect at (13,5) resulting in the selection box 417 appearing around the word "world" as shown after action 415 in which a user has selected the undo command. Thus the transformed history in history 414 properly reflects the selection behavior which has been transformed based upon the changes made by user B which was received by user A's system. The transformed history 414 also includes a transformation of the redo selection behavior which is now: select at (13,0). When user A selects the undo command in action 415, A's system executes the undo command (specified in history 414), which results in the word "world" reappearing and results in the selection box 417 appearing around the word "world" (as specified by the undo selection behavior in history 414). A's system can then create the transformed history 418, in which (in this embodiment) the undo command is removed and the redo command is created and added into history 418. A's system also includes in the transformed history 418 both the undo selection behavior (reselect (13,5)) and the redo selection behavior (select (13,0)). When user A selects the redo command in action 419, the text 420 is displayed on user A's system with the text cursor shown as cursor 421 indicating that the text insertion point is at position 13 after the redo command (which has caused the deletion of the word "world"). The action 419 (selection of redo command on A's system) causes A's system to also create the transformed history 422 which, in one embodiment, can be saved in data structures such as those data structures shown in FIG. 5. The redo command selected in action 419 deletes the word "world" and inserts the cursor 421 at the location as shown in FIG. 4 based respectively upon the redo command in history 418 and the redo selection behavior in history 418. The action 419 causes the creation of history 422 in which the undo command (insert "world" at (13,5)) is created and added into history 422 and the redo command is removed and the undo selection behavior (reselect (13,5)) and the redo selection behavior (select (13,0)) are added or maintained in the history 421. The transformation of the selection behavior data allows user A's system to properly reflect how the selected objects should appear in view of the changes reflected in the server copy. The updated or transformed selection behavior allows for the selection behavior to be consistent with local activity on the local user's system while also taking into account changes from the server copy.

In one embodiment, the undo and redo histories can be maintained in separate data structures, one for the undo history and another for the redo history while in another embodiment they can be combined together. In the example shown in FIG. 5, the undo history 501 includes separate sections for each command, such as sections 502 and 503. Similarly, the redo history 520 includes separate sections for each command such as sections 521 and 523. Each section includes a command and an identifier for the command as well as the undo command and the undo and redo selection behavior. For example, referring to section 502, that section includes a command 504 along with an identifier for the command and the corresponding undo command 505 and the corresponding undo and redo selection behavior 406. Similarly, section 503 includes a command 508 and an identifier for that command along with a corresponding undo command 509 and an undo and redo selection behavior 510. Similarly, the redo history data structure 520 includes, within section 521 a command 525 and its identifier along with a redo command 526 which corresponds to the command 525 and an undo and redo selection behavior 527. Section 523 includes a command and its identifier 531 as well as its corresponding redo command 532 and the undo and redo selection behavior 533. In the example shown in FIG. 4, the command received in action 406 can be the command 504 and the undo command 505 can be the undo command shown in history 409 and the undo and redo selection behavior 506 can be the undo selection behavior and the redo selection behavior shown in history 409. In the case of the redo history 520, the command 525 can be the undo command received in action 415 and the redo command 526 can be the redo command shown in history 418 and the undo and redo selection behavior 527 can be the undo selection behavior and the redo selection behavior shown in history 418. These commands and data can be transformed by the operational transformations described herein so that the history data structures contain the transformed histories (such as history 414).

In one embodiment, each undo command and each redo command is stored on a user's system in a transformed history with both a corresponding undo selection behavior and a corresponding redo selection behavior even though the user's system executes only one of them when a user chooses undo or redo. This is implemented in this way because a created redo command needs to be associated with the redo selection behavior that was associated with the undo command that just ran, and the created undo command needs to he associated with undo selection behavior that was associated with the redo command that just ran. In other words, the selection behavior for the inverse command should be stored, in one embodiment, so that it can be associated with the inverse command if/when that inverse command is created.

Figure 6:
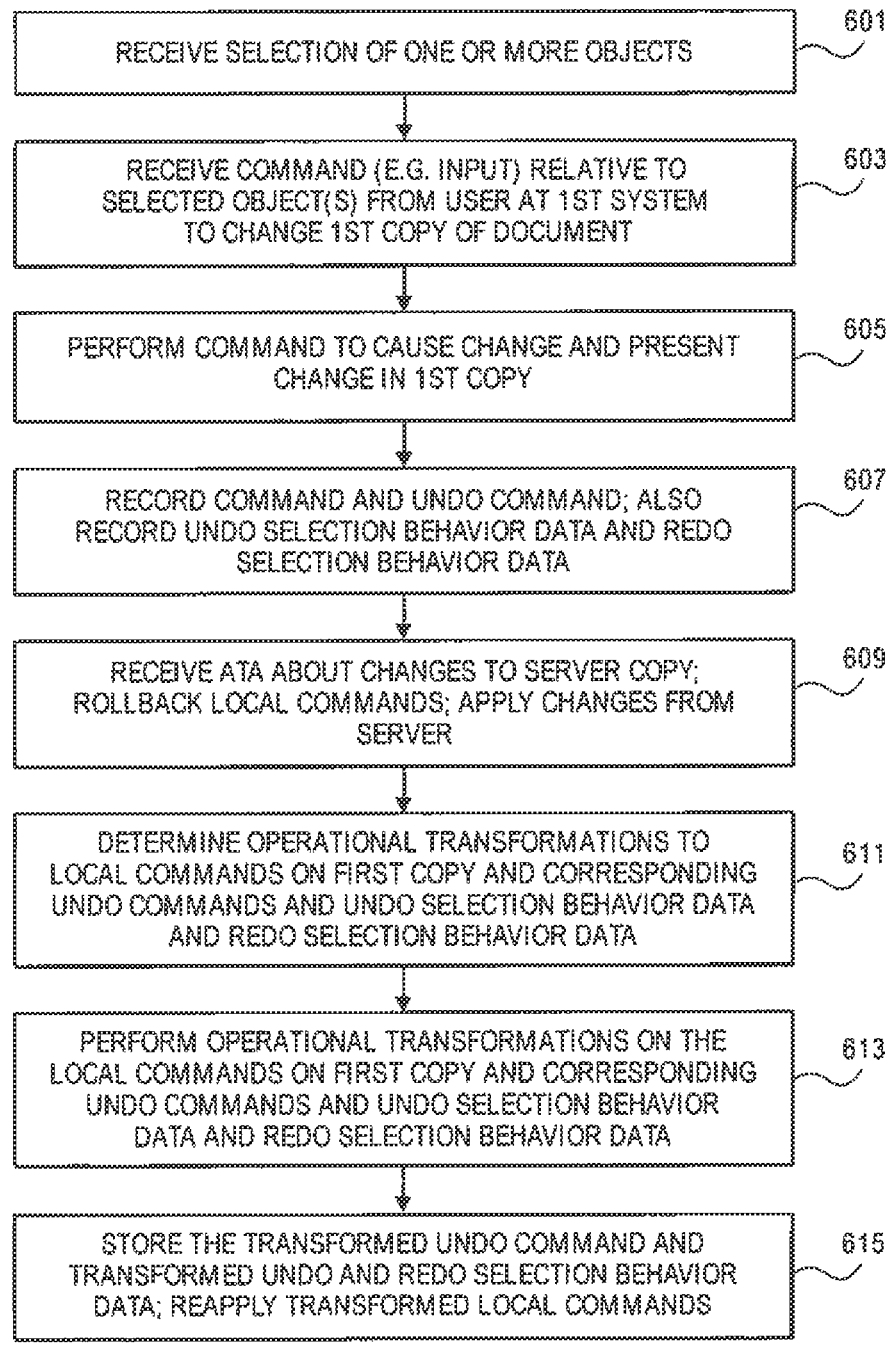
FIG. 6 shows a flowchart which depicts a method performed at user system according to one embodiment described herein.

The method shown in FIG. 6 will now be described in conjunction with the actions shown in FIG. 4. In operation 601, the local system, such as user A's system receives a selection of one or more objects. This corresponds to action 406 in which the user has selected the word "world" which is the selection of an object in the document. Then in operation 603 the system receives a command relative to the selected object from the user to cause a change to the first copy (local copy) of the document. This corresponds to the receipt of the delete command in operation or action 406 shown in FIG. 4. Then in operation 605, the local system performs the command received in operation 603 to cause the change and to present the change of the first copy. In one embodiment, the document is changed and then presented on, for example, a display of user A's system which reflects the state of the local copy. At this point, in operation 607, the local system can record the command and the corresponding undo command and also record the undo selection behavior and the redo selection behavior. This can result in the undo history 409 shown in FIG. 4. The undo selection behavior data can indicate a selection state of one or more objects in the local copy of the document which existed prior to the command received in operation 603. The redo selection behavior data can indicate a selection state alone or more objects in the local copy of the document which exists after the command which caused the change, such as the command received in operation 603.

In operation 609, a local system, such as user A's system receives data about changes to the server copy. This corresponds to action 411 in which user A's system receives changes which includes user B's change. In operation 609, the local system, in this case user A's system rolls back all local commands which were not sent since the last transmission to the server or which have not been acknowledged as received by the server. After rolling back those local commands, the local system applies the changes received from the server in operation 609. Then in operation 611, the local system, such as user A's system determines the operational transformations to the local commands on the local copy (first copy) and transformations to corresponding undo commands and redo commands and the undo selection behavior data and the redo selection behavior data. This is illustrated in FIG. 4 in which the history 409 has been transformed by operational transformations to create the transformed histories 414 which take into account the changes to the server copy received in operation 609. The operational transformations which are determined in operation 611 attempt to make the selection state consistent with user A or the local user's intent on the selections which were made prior to receiving the changes in operation 609. Then in operation 613, the local system performs the operations or transformations on the local commands on the first copy as well as on the corresponding undo commands and the undo selection behavior data and the redo selection behavior data. These transformed undo commands and transformed undo and redo selection behavior data can then be saved with the local copy in operation 615 and the local system can then reapply the transformed local commands so that the local copy reflects the changes from the server copy received in operation 609.

Referring back to FIG. 4, it can be seen that after the transformed history 414 is saved, an undo or a redo command will result in the proper position of the selection box 417 or the text cursor 421. Thus the selection behavior correctly reflects the intent of the user based upon the user's local system as well as changes received from the server copy.

Figure 7:
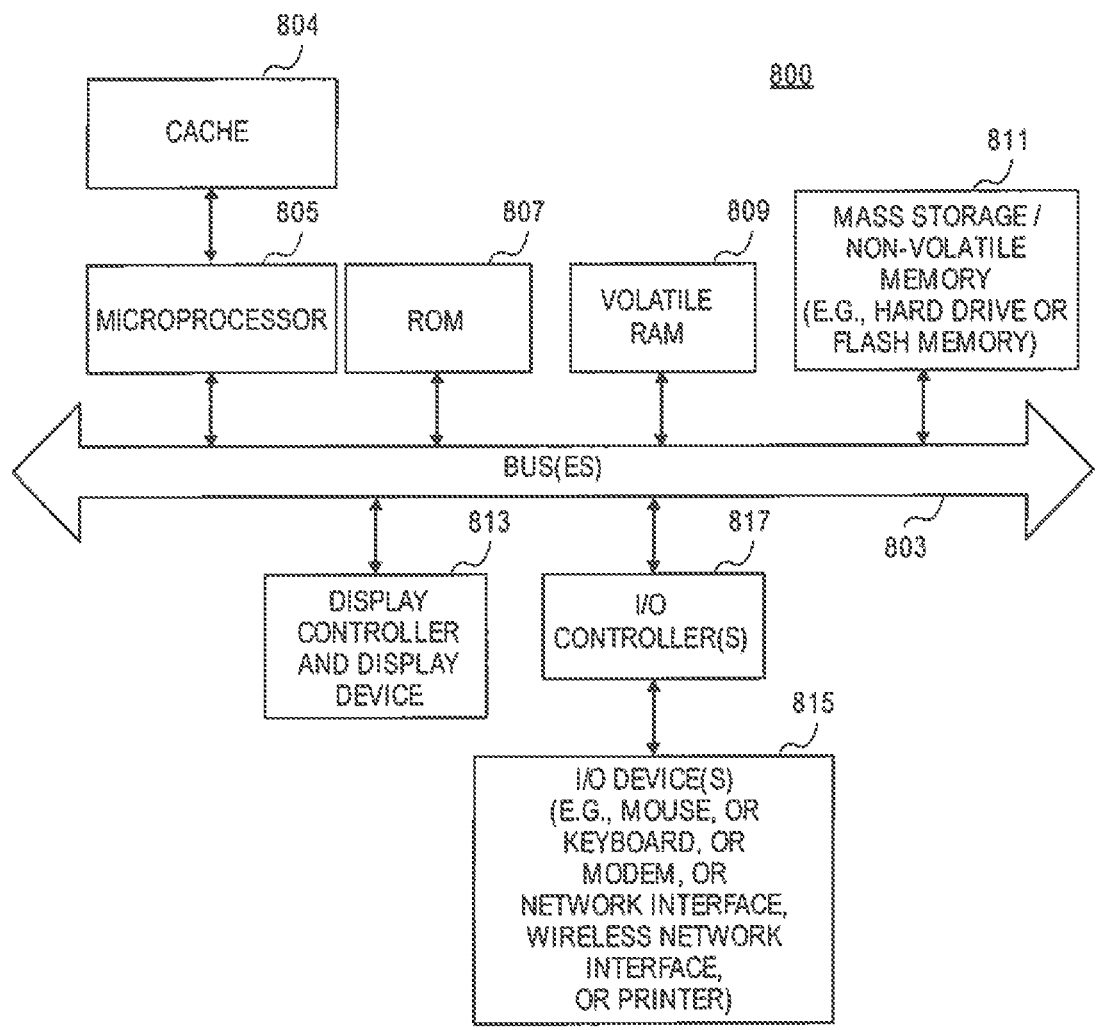
FIG. 7 shows an example of a data processing system that can be used to implement or perform one or more embodiments described herein.

FIG. 7 shows one example of a data processing system, which may be used with any one of the embodiments described herein. Note that while FIG. 7 illustrates various components of a data processing system, it is not intended to represent any particular architecture or manner of interconnecting the components as such details are not germane to this description. It will also be appreciated that network computers, tablet computers, smartphones, consumer electronic devices and other data processing systems which have fewer components or perhaps more components may also be used with one or more embodiments described herein. The system shown in FIG. 7 can be used to implement the one or more user systems, such as user systems 103 and 104 as well as the one or more server systems such as server system(s) 101.

As shown in FIG. 7, the computer system 800, which is a form of a data processing system, includes a bus 803 which is coupled to one or more microprocessor(s) 805 and a ROM (Read Only Memory) 807 and volatile RAM 809 (e.g. DRAM) and a non-volatile memory 811. The one or more microprocessors 805 are coupled to optional cache 804. The one or more microprocessors 805 may retrieve the stored instructions from one or more of the non-transitory memories 807, 809 and 811 and execute the instructions to perform operations described above. These memories represent examples of machine readable non-transitory storage media that can store or contain computer program instructions which when executed cause a data processing system to perform the one or more methods described herein. The bus 803 interconnects these various components together and also interconnects these components 805, 807, 809 and 811 to a display controller and display device 813 and to peripheral devices such as input/output (I/O) devices 815 which may be one or more of mice, touch screens, touch pads, touch sensitive input devices, keyboards, modems, network interfaces, printers and other devices which are well known in the art. Typically, the input/output devices 815 are coupled to the system through input/output controllers 817. The volatile RAM (Random Access Memory) 809 is typically implemented as dynamic RAM (DRAM) which requires power continually in order to refresh or maintain the data in the memory.

The mass storage 811 is typically a magnetic hard drive or a magnetic optical drive or an optical drive or a DVD RAM or a flash memory or other types of memory system which maintain data (e.g., large amounts of data) even after power is removed from the system. Mass storage 811 is a persistent memory. Typically the mass storage 811 will also be a random access memory although this is not required. While FIG. 7 shows that the mass storage 811 is a local device coupled directly to the rest of the components in the data processing system, it will be appreciated that one or more embodiments may utilize a non-volatile memory which is remote from the system, such as a network storage device which is coupled to the data processing system through a network interface such as a modem, an Ethernet interlace or a wireless network. The bus 803 may include one or more buses connected to each other through various bridges, controllers and/or adapters as is well known in the art.

In the foregoing specification, specific exemplary embodiments have been described. It will be evident that various modifications may be made to those embodiments without departing from the broader spirit and scope set forth in the following claims. The specification and drawings are, accordingly, to be regarded in an illustrative sense rather than a restrictive sense.

What is claimed is:

1. A non-transitory machine readable medium storing executable instructions which when executed by a data processing system cause the data processing system to perform a method in a collaborative environment which includes a server system and at least a first user system and a second user system, the server system coupled to the first user system and the second user system, the method performed on the first user system, the method comprising:

receiving an input which requests a change to a first copy of a document;

recording, in response to receiving the input, an undo command which is configured to undo the change to the first copy of the document;

recording an undo selection behavior data and recording a redo selection behavior data, the undo selection behavior data indicating a selection state of one or more objects in the first copy of the document which existed prior to the input, and the redo selection behavior data indicating a selection state of one or more objects in the first copy of the document which exists after the input causes the change, wherein the undo selection behavior data includes text cursor undo selection behavior data having a position and a length and the redo selection behavior data includes text cursor redo selection behavior data;

receiving data about changes to a server copy of the document, the data indicating one or more changes from the second user system;

determining one or more operational transformations to the input which indicates the change to the first copy and to the undo command and to the undo selection behavior data and to the redo selection behavior data, the one or more operational transformations are based on the data about changes to the server copy; and transforming the undo command and the undo selection behavior data and the redo selection behavior data based on the determined operational transformations.

2. The medium as in claim 1, the method further comprising:

receiving a selection of one or more objects in the first copy of the document prior to, or concurrent with, receiving the input which indicates the change to the first copy; and wherein the received selection of the one or more objects determines the selection state of the one or more objects prior to the input;

storing at the first user system the transformed undo command and the transformed undo selection behavior data and the transformed redo selection behavior data.

3. The medium as in claim 2 wherein the operational transformation to the undo selection behavior data transforms data about the selection state of one or more objects in the first copy which existed prior to input, wherein the operational transformation to the undo selection behavior data transforms one or more of: what objects are selected; selected or unselected state of one or more objects; sub-selection state of object; or position of selection box or current cursor input position; and wherein the operational transformation to the redo selection behavior data transforms data about the selection state of one or more objects in the first copy which exists after the input causes the change, wherein the operational transformation to the redo selection behavior data transforms one or more of: what objects are selected; selected or unselected state of object; sub-selection state of object; or position of selection box or current cursor input position.

4. The medium as in claim 3 wherein the change to the first copy is not in the server copy.

5. The medium as in claim 4 wherein the transformed undo selection behavior data and the transformed redo selection behavior data is not transmitted to the server system.

6. The medium as in claim 4 wherein the input which requests a change is a command, and for each command applied to the first copy at the first user system: its undo command and its redo command and the corresponding undo selection behavior data and the corresponding redo selection behavior data are stored in one or more history data structures at the first user system; and for each undo command and redo command in the one or more history data structures, data is stored to indicate the association with its corresponding undo selection behavior data and its corresponding redo selection behavior data.

7. The medium as in claim 6 wherein each command has a unique identifier and the first user system and the second user system each execute, over time, the same set of commands on their respective copies of the document in the same order which is specified by the server system.

8. The medium as in claim 7 wherein the first user system determines, by examining the data about changes to the server copy, whether the server system has acknowledged receipt of the input which requested the change to the first copy.

9. The medium as in claim 8, wherein the method further comprises:

in response to receiving the data about changes to the server copy:

rolling back, in the first copy, all commands received at the first user system that have either not been sent to the server system or not acknowledged by the server system if they were sent, the rolling back producing a rolled back first copy;

applying, on the rolled back first copy, the changes specified in the data about changes to the server copy;

transforming the rolled back commands based on the changes specified in the data about changes to the server copy, the transforming producing rolled back commands that are transformed;

reapplying, to the first copy, the rolled back commands that are transformed;

transmitting to the server system the change to the first copy.

10. The medium as in claim 9 wherein the method further comprises:

presenting the first copy with the change on the first user system.

11. A method in a collaborative environment which includes a server system and at least a first user system and a second user system, the server system coupled to the first user system and the second user system, the method performed on the first user system, the method comprising:

receiving an input which requests a change to a first copy of a document;

recording, in response to receiving the input, an undo command which is configured to undo the change to the first copy of the document;

recording an undo selection behavior data and recording a redo selection behavior data, the undo selection behavior data indicating a selection state of one or more objects in the first copy of the document which existed prior to the input, and the redo selection behavior data indicating a selection state of one or more objects in the first copy of the document which exists after the input causes the change, wherein the undo selection behavior data includes text cursor undo selection behavior data having a position and a length and the redo selection behavior data includes text cursor redo selection behavior data;

receiving data about changes to a server copy of the document, the data indicating one or more changes from the second user system;

determining one or more operational transformations to the input which indicates the change to the first copy and to the undo command and to the undo selection behavior data and to the redo selection behavior data, the one or more operational transformations are based on the data about changes to the server copy; and transforming the undo command and the undo selection behavior data and the redo selection behavior data based on the determined operational transformations.

12. The method as in claim 11, the method further comprising:

receiving a selection of one or more objects in the first copy of the document prior to, or concurrent with, receiving the input which indicates the change to the first copy; and wherein the received selection of the one or more objects determines the selection state of the one or more objects prior to the input;

storing at the first user system the transformed undo command and the transformed undo selection behavior data and the transformed redo selection behavior data.

13. The method as in claim 12 wherein the operational transformation to the undo selection behavior data transforms data about the selection state of one or more objects in the first copy which existed prior to input, wherein the operational transformation to the undo selection behavior data transforms one or more of: what objects are selected; selected or unselected state of one or more objects; sub-selection state of object; or position of selection box or current cursor input position; and wherein the operational transformation to the redo selection behavior data transforms data about the selection state of one or more objects in the first copy which exists after the input causes the change, wherein the operational transformation to the redo selection behavior data transforms one or more of: what objects are selected; selected or unselected state of one or more objects; sub-selection state of object; or position of selection box or current cursor input position.

14. The method as in claim 13 wherein the change to the first copy is not in the server copy.

15. The method as in claim 14 wherein the transformed undo selection behavior data and the transformed redo selection behavior data is not transmitted to the server system.

16. The method as in claim 14 wherein the input which requests a change is a command, and for each command applied to the first copy at the first user system: its undo command and its redo command and the corresponding undo selection behavior data and the corresponding redo selection behavior data are stored in one or more history data structures at the first user system; and for each undo command and redo command in the one or more history data structures, data is stored to indicate the association with its corresponding undo selection behavior data and its corresponding redo selection behavior data.

17. The method as in claim 16 wherein each command has a unique identifier and the first user system and the second user system each execute, over time, the same set of commands on their respective copies of the document in the same order which is specified by the server system.

18. The method as in claim 17 wherein the first user system determines, by examining the data about changes to the server copy, whether the server system has acknowledged receipt of the input which requested the change to the first copy.

19. The method as in claim 18, wherein the method further comprises:

in response to receiving the data about changes to the server copy:

rolling back, in the first copy, all commands received at the first user system that have either not been sent to the server system or not acknowledged by the server system if they were sent, the rolling back producing a rolled back first copy;

applying, on the rolled back first copy, the changes specified in the data about changes to the server copy;

transforming the rolled back commands based on the changes specified in the data about changes to the server copy, the transforming producing rolled back commands that are transformed;

reapplying, to the first copy, the rolled back commands that are transformed;

transmitting to the server system the change to the first copy.

20. The method as in claim 19 wherein the method further comprises:

presenting the first copy with the change on the first user system.

* * * * *